US012774935B2

(12) United States Patent
Pei

(10) Patent No.: US 12,774,935 B2
(45) Date of Patent: Oct. 27, 2026

(54) IN-SERVICE OTDR TRACE MONITORING FOR CHANGE OF FIBER AND RAMAN GAIN PROFILE WITH RAMAN AMPLIFICATION USING MACHINE LEARNING

(71) Applicant: Ciena Corporation, Hanover, MD (US)

(72) Inventor: Yinqing Pei, Kanata (CA)

(73) Assignee: Ciena Corporation, Fulton, MD (US)

( * ) Notice: Subject to any disclaimer, the term of this patent is extended or adjusted under 35 U.S.C. 154(b) by 627 days.

(21) Appl. No.: 18/092,633

(22) Filed: Jan. 3, 2023

(65) Prior Publication Data

US 2023/0236086 A1 Jul. 27, 2023

Related U.S. Application Data

(60) Provisional application No. 63/303,820, filed on Jan. 27, 2022.

(51) Int. Cl.
*G01M 11/00* (2006.01)

(52) U.S. Cl.
CPC ............................... *G01M 11/3145* (2013.01)

(58) Field of Classification Search
None
See application file for complete search history.

(56) References Cited

U.S. PATENT DOCUMENTS

| | | | | |
|---|---|---|---|---|
| 10,746,602 | B2 | 8/2020 | Pei et al. | |
| 11,125,648 | B2 * | 9/2021 | Perron | G01M 11/3109 |
| 11,477,070 | B1 | 10/2022 | Pei et al. | |
| 2009/0113049 | A1 * | 4/2009 | Nasle | G05B 13/026 709/224 |
| 2020/0049587 | A1 * | 2/2020 | Rapp | G01M 11/3109 |
| 2022/0149938 | A1 | 5/2022 | Pei et al. | |
| 2022/0294529 | A1 | 9/2022 | Janulewicz et al. | |
| 2022/0329033 | A1 | 10/2022 | Demars et al. | |

FOREIGN PATENT DOCUMENTS

| | | | | |
|---|---|---|---|---|
| EP | 1772979 | A2 * | 4/2007 | H04B 10/0791 |
| EP | 2701248 | A2 * | 2/2014 | H01S 3/0014 |

* cited by examiner

*Primary Examiner* — Matthew G Marini
(74) *Attorney, Agent, or Firm* — Baratta Law PLLC; Lawrence A. Baratta, Jr.

(57) ABSTRACT

Optical Time Domain Reflectometer (OTDR) trace monitoring for change of fiber and Raman gain profile with Raman amplification uses Machine Learning. The OTDR trace monitoring includes obtaining data associated with a plurality of Optical Time Domain Reflectometer (OTDR) traces each performed at a different time; responsive to changes between the plurality of OTDR traces being above a threshold, analyzing the changes between the plurality of OTDR traces with a trained machine learning model; and determining an impact factor based on the machine learning model, wherein the impact factor is a classification of the changes between the plurality of OTDR traces.

20 Claims, 14 Drawing Sheets

| | Fiber length | Fiber type | Fiber loss | Pump power array | Center of mass of in-service channels | Total power of in-service channels | OTDR trace under this condition |
|---|---|---|---|---|---|---|---|
| Change of this parameter will be classified as | won't change for a specific fiber | | Change reason #3 | Change reason #4 | Change reason #5 | | |
| sample #1 | 80 | NDSF1 | 0.2 | [20,20,20,20] | 193150 | 23 | [...] |
| sample #2 | 80 | NDSF1 | 0.2 | [20,20,20,21] | 191350 | 0 | [...] |
| ... | | | | | | | |
| sample #x | 100 | ELEAF | 0.21 | [23,21,20,21] | 195100 | 10 | [...] |
| ... | | | | | | | |
| ... | | | | | | | |

IN-SERVICE OTDR TRACE MONITORING FOR CHANGE OF FIBER AND RAMAN GAIN PROFILE WITH RAMAN AMPLIFICATION USING MACHINE LEARNING

CROSS-REFERENCE

The present disclosure claims priority to U.S. Provisional Patent Application 63/303,820, filed Jan. 27, 2022, the contents of which are incorporated by reference in their entirety.

FIELD OF THE DISCLOSURE

Generally, the field of art of the present disclosure pertains to fiber optic systems and methods, and more particularly, to Optical Time Domain Reflectometer (OTDR) trace monitoring for change of fiber and Raman gain profile with Raman amplification using Machine Learning.

BACKGROUND OF THE DISCLOSURE

Conventionally, OTDRs inject a series of optical pulses into the fiber under test and extract, from the same end of the fiber, light that is scattered (i.e., Rayleigh backscatter) or reflected back from points along the fiber. Results from OTDRs are used for estimating the fiber's length, overall attenuation, and discontinuities along the fiber. Such information about the fiber under test is particularly relevant in the context of Raman amplifiers where Raman pumps input high-powered wavelengths in a co-propagated and/or counter-propagating manner in the fiber with information carrying wavelengths. That is, with high-powered wavelengths, it is desirable to know about fiber conditions particularly discontinuities and the like. Conventionally, there have been several attempts to integrate fiber testing functionality with Raman amplifiers. These conventional implementations can be characterized in two categories, namely 1) use of dedicated optical components or test equipment to provide the OTDR function within a Raman amplifier or 2) use one of the Raman pump lasers as the OTDR source. Disadvantageously, dedicated optical components lead to increased cost, power, and/or space requirements and use of one of the Raman pump lasers prevents in-service operation (i.e., no testing when the Raman pump lasers are in-service). Thus, relative to conventional systems and methods, there is a need to integrate OTDR functionality with optical amplifier systems and methods while minimizing cost, and a need to operate the OTDR functionality while the optical amplifier systems and methods are either out-of-service or in-service, and the like.

Commonly-assigned U.S. Pat. No. 10,374,704, issued Aug. 6, 2019, and entitled "RAMAN AMPLIFIER SYSTEM AND METHOD WITH INTEGRATED OPTICAL TIME DOMAIN REFLECTOMETER," the contents of which are incorporated by reference in their entirety, describes an integrated OTDR approach with an optical line system utilizing Raman amplification.

Commonly-assigned U.S. Pat. No. 9,419,708, issued Aug. 16, 2016, and entitled "LIVE MONITORING OF RAMAN AND FIBER DEGRADATION IN DWDM NETWORKS USING IN-SERVICE OTDR," the contents of which are incorporated by reference in their entirety, describes an analytical approach of distinguishing between the OTDR trace with the Raman amplifiers ON and OFF.

While the above patents improve monitoring of optical links via OTDR, there are still issues to address. For example, it is difficult to determine different impact factors on an OTDR trace, see FIG. 6B which shows a pronounced change due to a fiber loss change or Stimulate Raman Scattering (SRS) effect from service channels to the OTDR trace. Further, it is difficult to distinguish between an expected OTDR trace, an unexpected OTDR trace change, and the associated root cause of the change.

OTDR is one of the most powerful tools for identifying issues of fibers in the field. Conventionally, OTDR is only used during commissioning of the system to check fiber connections before Raman amplification is turned on and channels are being added. In fact, there is a great value of running in-service OTDR periodically to detect change of the OTDR trace over time and raise alarm for unexpected changes. However, the challenge is that there is not a way to isolate the changes due to different impact factors and distinguish between expected and unexpected changes.

BRIEF SUMMARY OF THE DISCLOSURE

The present disclosure relates to Optical Time Domain Reflectometer (OTDR) trace monitoring for change of fiber and Raman gain profile with Raman amplification using Machine Learning. The present disclosure includes a technique based on machine learning to detect and classify unexpected changes of in-service OTDR trace over time. In various embodiments, the present disclosure can include a method having steps, a network element configured to implement the steps, circuitry configured to implement the steps, and a non-transitory computer-readable medium with instructions that, when executed, cause one or more processors to implement the steps. The steps include obtaining data associated with a plurality of Optical Time Domain Reflectometer (OTDR) traces each performed at a different time; responsive to changes between the plurality of OTDR traces being above a threshold, analyzing the changes between the plurality of OTDR traces with a trained machine learning model; and determining an impact factor based on the machine learning model, wherein the impact factor is a classification of the changes between the plurality of OTDR traces.

The impact factors can include a plurality of change of lumped loss or reflection events at different locations of fiber, change of Raman amplification after change of Raman configuration, change of fiber loss, unexpected change of Raman amplification, and change of channel loading condition. The steps can further include storing a specific OTDR trace of the plurality of OTDR traces as a baseline; and performing the analyzing based on a current OTDR trace of the plurality of OTDR traces and the baseline. The steps can further include, prior to the analyzing and the determining, one or more of smoothing and down sampling one of the plurality of OTDR traces. The steps can further include, subsequent to the determining, raising an alarm based thereon with the classification and with suggested corrective actions. A change of lumped loss or reflection events can be detected based on comparing OTDR reported events between current OTDR trace of the plurality of OTDR traces and the baseline. The plurality of OTDR traces can be performed in-service. The steps can further include training the machine learning model prior to the analyzing. The training can utilize randomly selected sample that exhibit a given impact factor.

BRIEF DESCRIPTION OF THE DRAWING(S)

The present disclosure is illustrated and described herein with reference to the various drawings, in which like reference numbers are used to denote like system components/ method steps, as appropriate, and in which.

Figure 11:
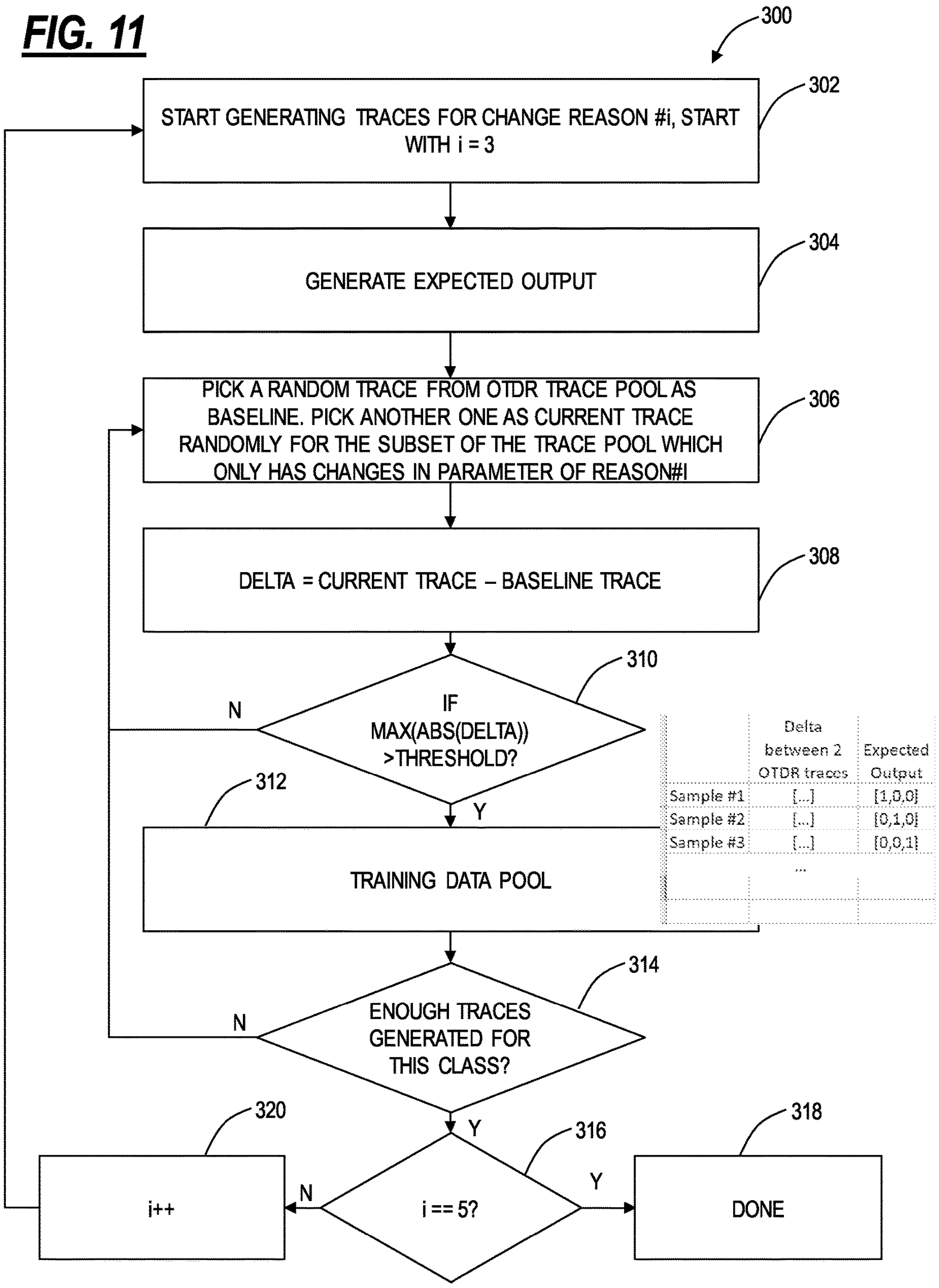

FIG. 11 which is a flowchart of a random selection process for determining machine learning training data.

Figure 12:
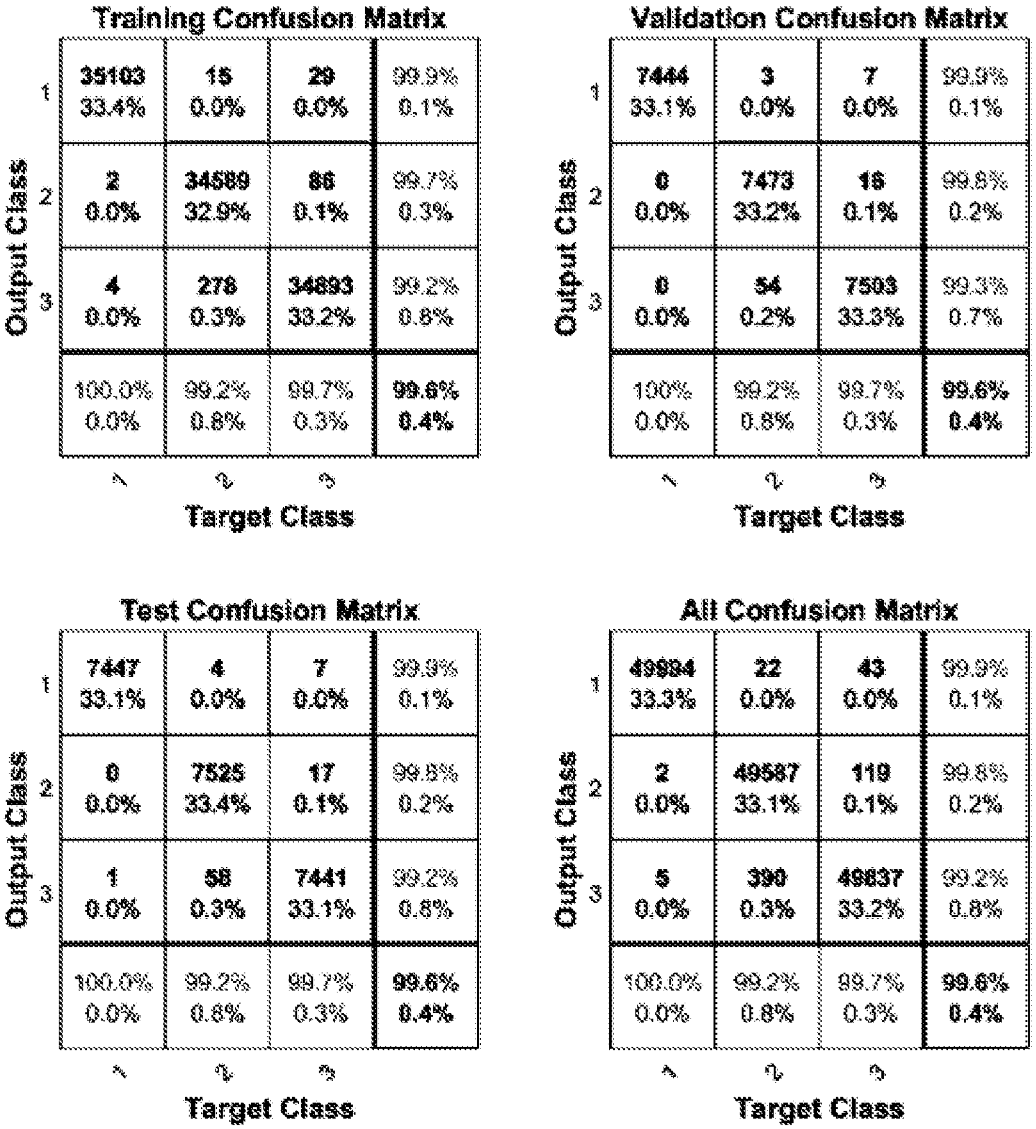

FIG. 12 are example confusion matrices illustrating the machine learning model can correctly classify OTDR changes greater than 99% of the time.

Figure 13:
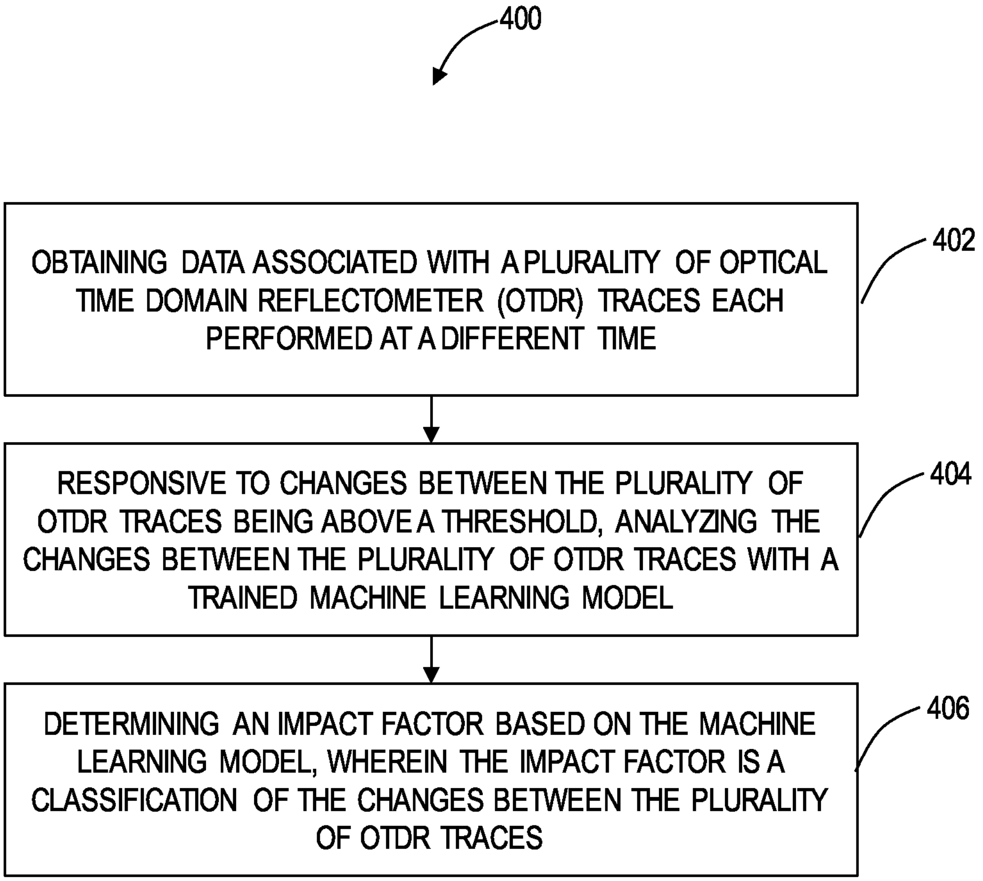

FIG. 13 is a flowchart of an OTDR trace monitoring process.

DETAILED DESCRIPTION OF THE DISCLOSURE

The present disclosure relates to Raman amplifier systems and methods with an integrated Optical Time Domain Reflectometer (OTDR) for integrated testing functionality. In operation, a Raman amplifier sends a very high amount of optical power (~0.5-1 W) into fiber plant to provide gain for the data-carrying optical channels. The OTDR allows the Raman amplifier to verify the integrity of the fiber plant, measuring critical parameters like insertion loss, propagation loss, and back reflections from optical connectors. This provides the capability to identify potential problems before the high-power Raman pumps are enabled and then to monitor the health of the fiber plant over time. Specifically, the Raman amplifier systems and methods minimize cost by sharing major optical and electrical components between the integrated OTDR and other functions on the Raman amplifier. Further, the Raman amplifier systems and methods provide a mechanism to operate the OTDR both out-of-service (during system provisioning) and in-service (while the system is carrying live traffic). Also, the Raman systems and methods can use the OTDR information to estimate Raman gain and to track changes in the fiber plant over time.

The present disclosure utilizes various machine learning techniques to analyze an OTDR trace with Raman amplification ON to determine the corresponding OTDR trace without Raman amplification. That is, taking an OTDR trace with Raman ON and backing out the OTDR trace when Raman is off. This enables an integrated OTDR to monitor fiber changes over time where the corresponding optical line system utilizes Raman amplification. This can also be used to determine the Raman gain provide over time. The present disclosure includes detection and classification of types of changes of in-service OTDR traces over time, using a machine learning model and corresponding training procedures.

The present disclosure includes a technique based on machine learning to detect and classify unexpected changes of in-service OTDR trace over time.

Integrated OTDR

Figure 1:
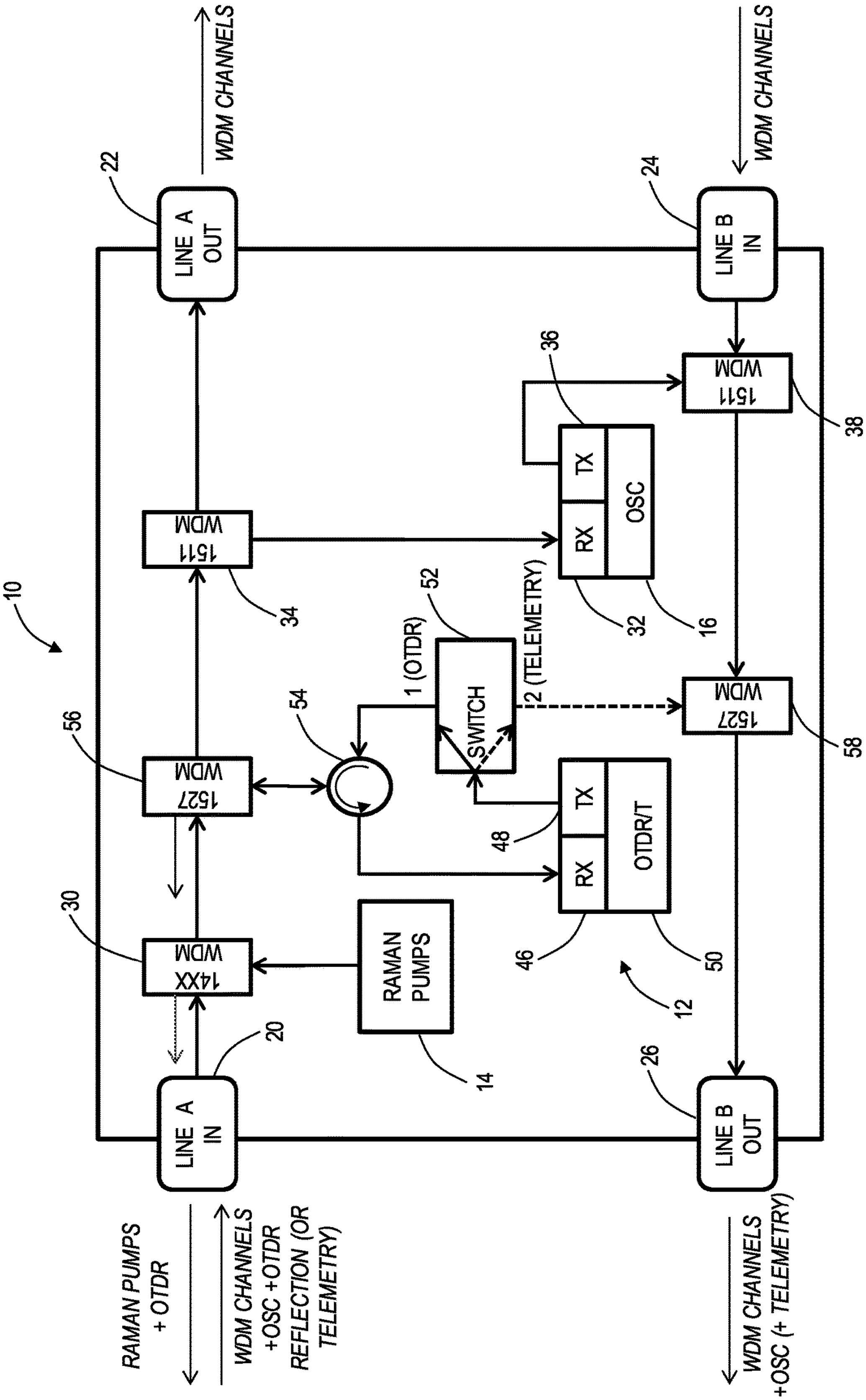
FIG. 1 is a block diagram of a Raman amplifier with an integrated OTDR/telemetry subsystem.

Referring to FIG. 1, in an embodiment, a block diagram illustrates a Raman amplifier 10 with an integrated OTDR/ telemetry subsystem 12. Functionally, the Raman amplifier 10 includes three subsystems, namely the OTDR/telemetry subsystem 12, Raman pumps 14, and an Optical Service Channel (OSC) 16. The Raman amplifier 10 is a two-fiber device meaning the Raman amplifier 10 supports two fibers, line A and line B, with a line A in port 20, a line A out port 22, a line B in port 24, and a line B out port 26. In the configuration of FIG. 1, the Raman amplifier 10 is counter-pumping line A and monitoring line B. That is, the ports 20, 26 are facing outside fiber plant, and the ports 22, 24 are facing internally in a node (i.e., to other components such as erbium doped fiber amplifier (EDFA) amplifiers, add/drop multiplexers, wavelength selective switches, transceivers, etc.). The Raman pumps 14 include one or more high-powered lasers at various Raman wavelengths (e.g., 1420-1465 nm, 1424/1434 nm, 1455/1465 nm, etc.). These lasers are added to the line A via a 14XX wavelength division multiplexing (WDM) filter 30 that is configured to add wavelengths in the 14XX range to the line A which can include information-carrying wavelengths in the 15XX range.

The Raman pumps 14 can include Raman pump lasers, optical depolarization and multiplexing, control circuitry, and sensors to enable Raman pumping. In an embodiment, a baseline pump design can include a plurality of 14XX nm pump wavelengths with total optical powers of about 1.0 W. The OSC 16 includes a receiver (RX) 32 that is coupled off the line A via a 1511 nm WDM filter 34 and a transmitter (TX) 36 that is added to the line B via a 1511 nm WDM filter 38. In this embodiment, the OSC 16 is at 1511 nm although other wavelengths are also contemplated. The OSC provides a communication channel between nodes for operations, administration, maintenance, and provisioning (OAM&P) functionality.

In the Raman amplifier 10, the OTDR/telemetry subsystem 12 has dual functionality of being an OTDR and a telemetry channel. The OTDR/telemetry subsystem 12 includes a receiver (RX) 46, a transmitter (TX) 48, and circuitry 50. The receiver 46, transmitter 48, and circuitry 50 are shared between OTDR and telemetry functions. An optical switch 52 is used to select one of the two modes of operation, OTDR and telemetry. In an OTDR mode, the optical switch 52 is set to a first position coupling the transmitter 48 to an optical circulator 54. The optical circulator 54 connects to a 1527 nm WDM filter 56 (e.g., the transmitter 48 can be at 1527 nm although other wavelengths are also contemplated). In an embodiment, the optical circulator 54 can be replaced with a coupler. For example, a coupler could have additional insertion loss (e.g., 6 dB instead of 2 dB for the optical circulator 54) which would reduce the dynamic range of the OTDR, but would be cost reduced. The WDM filter 56 couples the transmitter 48 to the line A. Also, the WDM filter 56 couples the line A to the receiver 46 for back reflection detection. In the OTDR mode, the circuitry 50 is configured to transmit an OTDR pulse via the transmitter 48 that is launched backward in the line A into the port 20, i.e., the OTDR pulse is counter-propagating relative to any WDM channels on line A. The Raman pumps 14, when active, are launched in the same direction as the OTDR pulse. The OTDR pulse produces a back-scattered signal, which reflects back into the port 20 entering the Raman amplifier 10 in the forward direction. The optical circulator 54 then directs the back-scattered signal into the receiver 46, where it is digitized and analyzed by the circuitry 50 or other devices such as a shelf processor.

In telemetry mode, the optical switch 52 is set to a second position coupling the transmitter 48 to the port 26, where a telemetry signal from the transmitter 48 co-propagates with WDM channels in that line B fiber. With the optical switch 52 in the second position, the transmitter 48 is inserted into the line B via a 1527 nm WDM filter 58. In this mode, the port 26 allows the Raman amplifier 10 to communicate or signal to another Raman amplifier 10 provisioned at an upstream node in a fiber optic system. That upstream Raman amplifier 10 can communicate back to the Raman amplifier 10 by sending a signal at a similar wavelength into the line A port 20, where it is split off via the WDM filter 56 and the optical circulator 54 to the receiver 46. Thus with the use of the optical switch 52 and the optical circulator 54, the receiver 46 and the transmitter 48 can be shared between the OTDR and telemetry applications.

Thus, OTDR/telemetry subsystem 12 can be an out-of-band counter-propagating OTDR or a co-propagating out-of-band telemetry channel used to actively measure the Raman gain. Both of these signals are near 1527 nm, i.e., both these signals are the same wavelength based on sharing the transmitter 48. The OTDR functionality can be used during test and turn up to ensure the fiber span and connectors meet necessary requirements for activating the Raman pumps 14. The telemetry functionality is used to actively measure the Raman gain during normal operation. During normal operation, the OTDR functionality can be remotely enabled via software to switch the optical switch 52 to also enable on-demand OTDR testing in-service. Note, the circuitry 50 is configured to function as an OTDR, i.e., transmitting pulses and measuring back-scatter, and as a telemetry channel, i.e., transmitted modulated data and receiving the same. The circuitry 50 is also communicatively coupled to a node controller, shelf processor, etc. for conveying data from the OTDR/telemetry subsystem 12. For example, in the OTDR mode, the circuitry 50 can deliver calibrated back reflection data versus distance to the shelf processor via standard intra-shelf communications protocols. Also, the OTDR/telemetry subsystem 12 can be commanded into the OTDR mode of the telemetry mode by the shelf processor.

The OTDR/telemetry subsystem 12 can perform several functions in the telemetry mode. First, the transmitter 48 provides a real time measurement of the Raman gain separate from any WDM channels. This may be used for long term monitoring of the health of the fiber plant and Raman amplifier 10, and may also be used for relatively rapid real time control. The telemetry channel also works in parallel with the OSC 16 and other sensors to provide robust and redundant fault monitoring. That is, the telemetry mode of the OTDR/telemetry subsystem 12 provides a second OSC channel for redundancy. In some cases, Raman amplification must be used on very high loss span that exceeds the OSC link budget (e.g., festoon or channel crossings), and in these cases, an optical sensor redundant to the OSC channel is needed to provide for acceptable fault management and eye safety protocols. The telemetry channel provides a redundant safety mechanism, meaning that the Raman amplifier 10 is able to distinguish between a fiber cut (affects the OTDR/telemetry subsystem 12 and the OSC 16) and an OSC failure (affects the OSC 16 only). The telemetry channel can also be used to communicate between nodes, but at a much lower data rate compared to the OSC 16.

Figure 2:
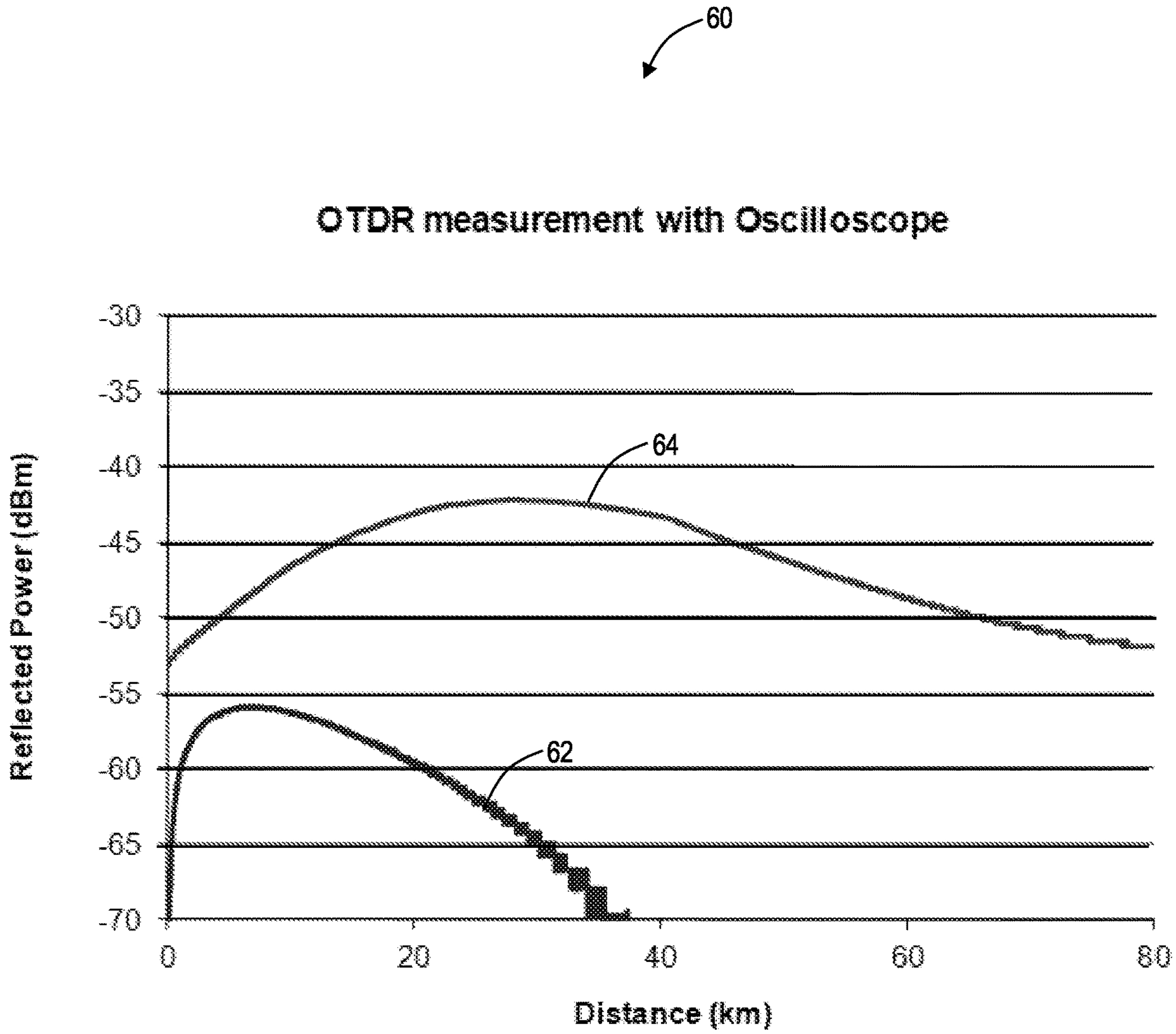
FIG. 2 is a graph of an example OTDR trace using the Raman amplifier of FIG. 1 and the OTDR/telemetry subsystem.

In an embodiment of the Raman amplifier 10, the wavelength that has been selected for the transmitter 48 in the OTDR/telemetry subsystem 12 is 1527 nm. This enables this signal to coexist with the Raman pumps (e.g., 1420-1470 nm) and WDM channels (e.g., 1527.5-1567 nm) without interference. Any wavelength between the Raman pump wavelengths and the WDM channel wavelengths can be used. In particular, this makes it possible for the OTDR to be used in-service, i.e., while the WDM channels are active. In the absence of the Raman pump, the OTDR provides a measure of the propagation and interconnection losses in the fiber plant. Referring to FIG. 2, in an embodiment, a graph illustrates an example OTDR trace 60 using the Raman amplifier 10 and the OTDR/telemetry subsystem 12. The OTDR trace 60 includes two traces 62, 64, an OTDR trace 62 with Raman pumps off and an OTDR trace 64 with Raman pumps on. With the Raman pumps enabled, the 1527 nm OTDR pulse experiences gain as it propagates down the fiber, which affects the OTDR trace as shown in the OTDR trace 64. By comparing these two traces 62, 64, it is possible to estimate the Raman gain in the fiber after the pumps are turned on. Then by measuring the OTDR trace periodically, one can monitor the health of the system as changes in fiber loss or Raman gain create a corresponding change in the OTDR traces 62, 64. This can provide a powerful new diagnostic tool for network operators.

In another embodiment, the transmitter 48 can be tunable allowing for different OTDR wavelengths (and telemetry wavelengths). Alternatively, the transmitter 48 can include separate transmitters contained therein at different wavelengths. This can be used to monitor Raman gain and fiber loss separately. By switching the OTDR wavelength to a region where the Raman gain is near zero (e.g., 1610 nm), fiber losses could be measured accurately in-service via an OTDR measurement, independently of the Raman gain. With a tunable wavelength implementation of the transmitter 48, there could be a potential to measure the Raman gain within the WDM signal band as well in-service, by tuning the OTDR wavelength to any unused WDM channels. Also, this embodiment requires the WDM filter 56 be tunable as well to track the wavelength tuning of the transmitter 48.

As described herein, the OTDR/telemetry subsystem 12 is embedded into the Raman amplifier 10. Note, the Raman amplifier 10 can be realized as a module, circuit pack, line card, "pizza box", subsystem, and the like for operation in a larger, WDM system. Also, the OTDR/telemetry subsystem 12 contemplates operation in other modules besides the Raman amplifier 10, such as an erbium doped fiber amplifier (EDFA) module, an OSC module, etc. The OTDR function of the OTDR/telemetry subsystem 12 generates calibrated back reflection versus distance data files that can be used by a shelf processor. In an embodiment, the OTDR function in the amplifier pack does not interpret the traces, except if the connector back-reflection is so large that it represents an open connector, in which case the Raman amplifier 10 will not turn on. The shelf processor, which can include general purpose and/or special purpose processing logic, can be used to perform the data analysis of the data files thereby removing processing complexity from the OTDR/telemetry subsystem 12.

Advantageously, the OTDR function ensures that connectors have a sufficiently low loss and low back reflection so that the Raman amplifier 10 operates properly and connectors will not be damaged at ~1 W Raman pump levels. Experimental work indicates that back reflection of less than −45 dB results in a robust and resilient connectors that will not be damaged by optical power, and minimizes and multi-path interference (MPI) effects that could degrade system performance. In an embodiment, the OTDR is able to accurately measure a −45 dB back-reflection within 0-1000 meters of the Raman amplifier 10 with a signal-to-noise ratio, SNR>10 dB. The OTDR function is also able to resolve back reflections from local connectors. For example, local connectors generally include connectors in the same location as the Raman amplifier 10 such as on a front panel on the Raman amplifier 10, at fiber distribution frames, etc. These connectors can be spaced as close as 2-3 meters apart from each other in practice.

Operational Process

Figure 3:
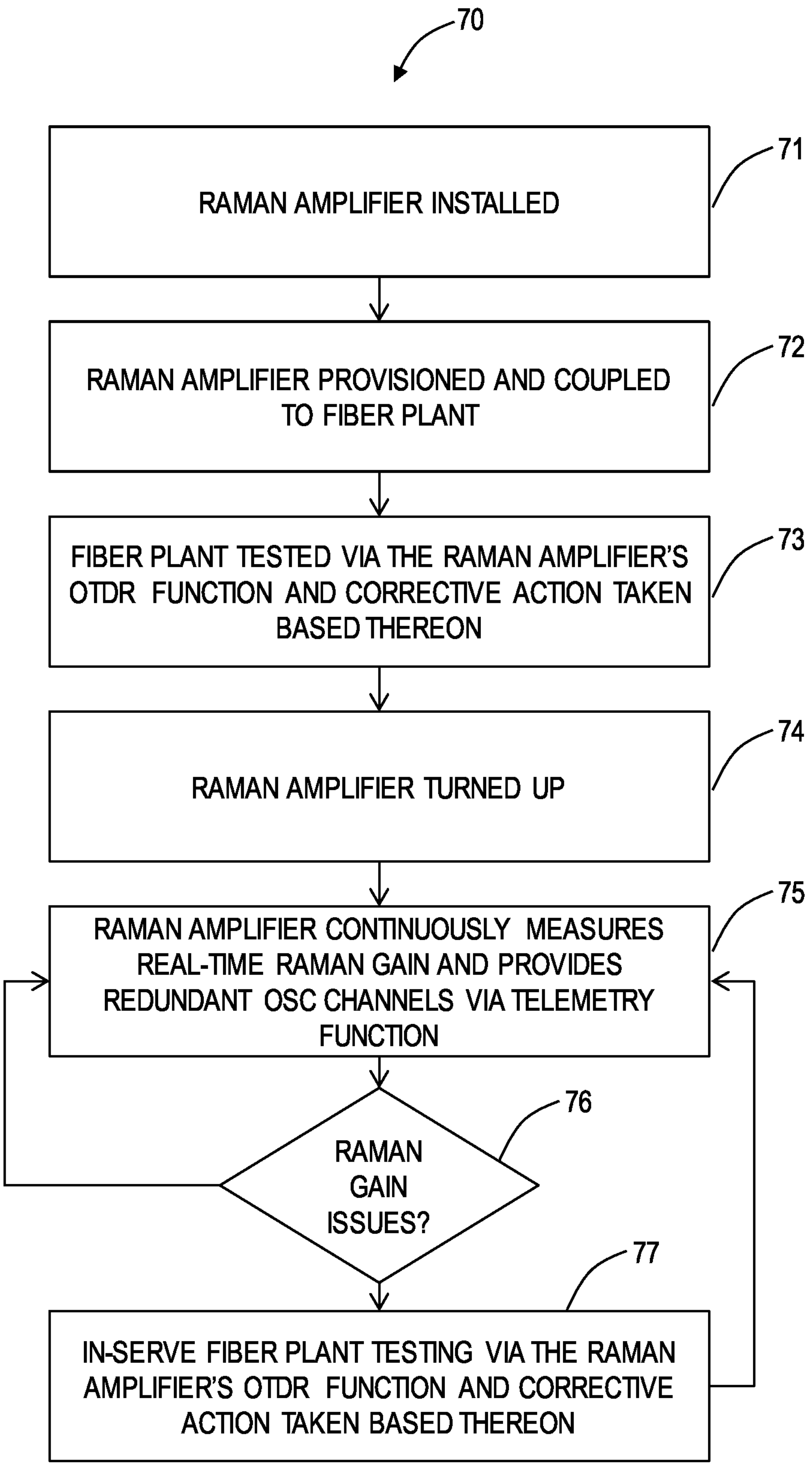
FIG. 3 is a flowchart of an operational method provisioning, testing, turning up, and operating the Raman amplifier of FIG. 1.

Referring to FIG. 3, in an embodiment, a flowchart illustrates an operational method 70 provisioning, testing, turning up, and operating the Raman amplifier 10. Advantageously, the Raman amplifier 10 provides an integrated system enabling automated provisioning, test, and turn up capabilities to minimize complexities faced by a service provider as well as in-service monitoring over time. The operational method 70 provides an example use of the Raman amplifier 10 in an optical network. First, the Raman amplifier 10 is installed (step 71). That is, the Raman amplifier 10 is physically placed in a system, shelf, frame, etc. and provided power, etc. The Raman amplifier 10 is provisioned and coupled to fiber plant (step 72). Prior to activating the Raman pumps 14, the fiber plant is tested via the OTDR function of the Raman amplifier 10, and any corrective action is taken based thereon (step 73). For example, many real-world problems with Raman amplifiers occur due to non-ideal conditions associated with the inside and outside plant fiber such as connector losses, excess bend losses in conduits, unanticipated outside plant fiber loss or point losses, and improperly characterized fiber type. Subsequent to the test, corrective action can be taken to improve any problems. The integrated OTDR can be used to eliminate nearly all of the uncertainty that may exist when deploying Raman amplifiers, permitting nearly autonomous provisioning, test and turn up capabilities.

Once corrective actions are taken (if any), the Raman amplifier 10 can be turned up enabling the Raman pumps 14 (step 74). Here, the Raman amplifier 10 can switch from the OTDR functionality of the OTDR/telemetry subsystem 12 to the telemetry functionality. The Raman amplifier 10 can continuously measure real-time Raman gain while concurrently providing a redundant OSC channel via the telemetry functionality (step 75). During the continuous measurement, if there are Raman gain issues or periodically (step 76), the Raman amplifier 10 can switch from the telemetry functionality to the OTDR functionality and perform in-service fiber plant testing and take any corrective action based thereon (step 77).

OTDR Mode

Figure 4:
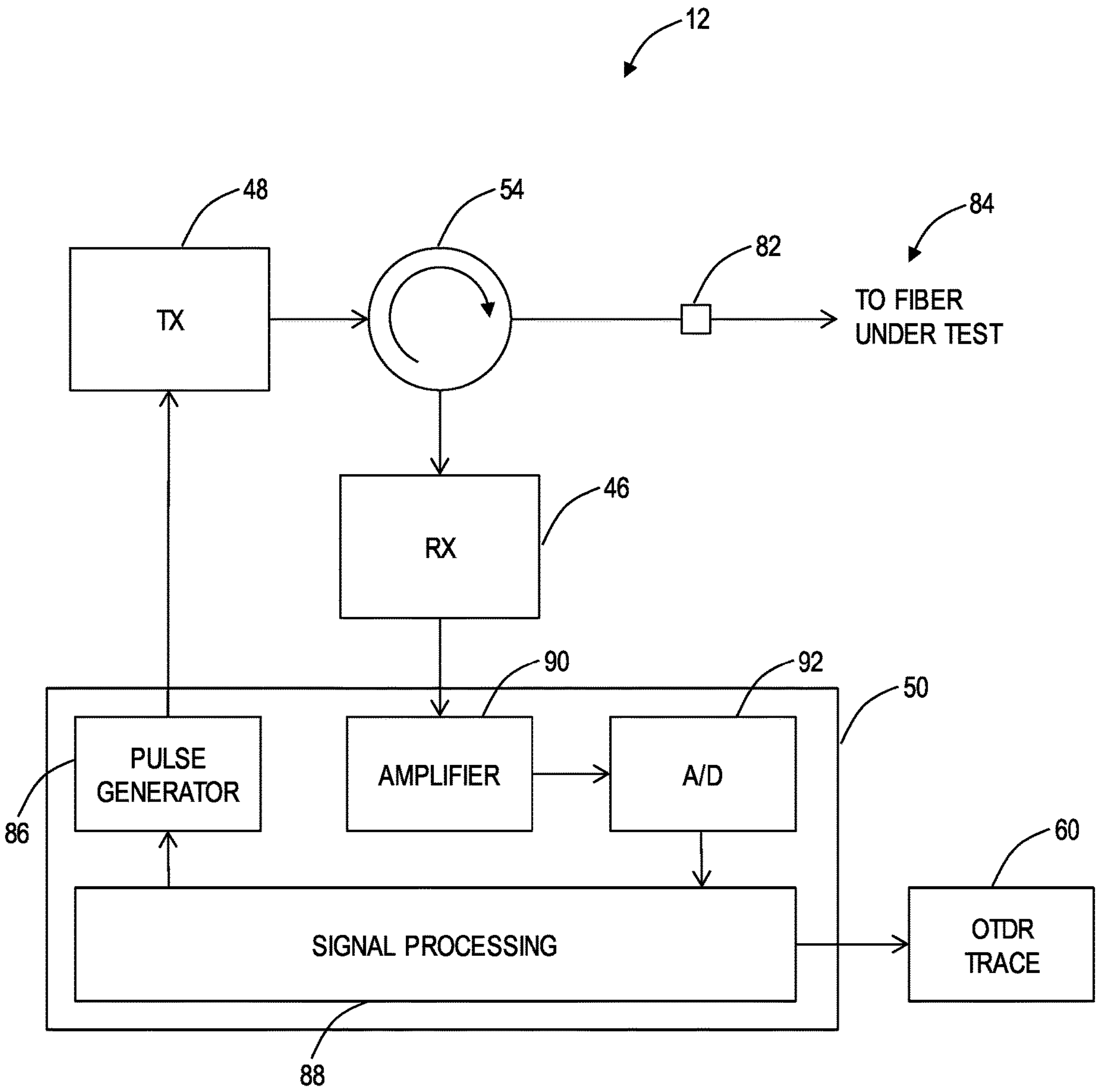
FIG. 4 is a functional block diagram of the OTDR/ telemetry subsystem in the OTDR mode for the Raman amplifier of FIG. 1.

Referring to FIG. 4, in an embodiment, a functional block diagram illustrates the OTDR/telemetry subsystem 12 in the OTDR mode. FIG. 4 illustrates only components in the Raman amplifier 10 participating the OTDR mode. Specifically, the optical circulator 54 has a port coupled to a fiber connector 82 that ultimately connects to fiber under test (FUT) 84. Note, the optical circulator 54 can also be a directional coupler or any other three-port device that enables both the transmitter 48 and the receiver 46 to connect to the FUT 84. FIG. 4 also includes additional details in the circuitry 50 related to the OTDR mode. On the transmitter 48 side, the circuitry 50 includes a pulse generator 86 connected to a signal processing block 88. Collectively, the pulse generator 86 and the signal processing block 88 are configured to generate specific length pulses to drive/modulate the transmitter 48. Note, the pulse length for the transmitter 48 correlates to how much bandwidth is required in the receiver 46. Without reflections in the FUT 84, different pulse widths will achieve similar OTDR slope or fiber loss profile, but one purpose of the ODTR is to measure possible back reflection and location. This requires a short pulse.

It has been determined that a pulse width of between 10 ns and 100 us is acceptable. Preferably, shorter pulses (e.g., about 10 ns for the transmitter 48) are used for measuring the first few km's of the FUT 84. For longer distances (e.g., 100 km), much longer pulses can be used such as 10 us and the like. In this case, the bandwidth of the receiver can be reduced considerably to less than 100 kHz. For example, the Raman amplifier 10 is most concerned about back reflection close to the port 20 as this is where there are safety and equipment concerns with high-powered lasers. That is, the OTDR mode of the OTDR/telemetry subsystem 12 is primarily concerned with detecting fiber related issues impairing Raman operation. In an embodiment, the OTDR mode is configured to measure about 4% back reflection within about the first 30 km of the FUT 84 using a 10 ns pulse. For a 10 ns pulse, ideally, 100 MHz bandwidth is required on the receiver 46 although this can be reduced for cost reduction without significant impact in performance to about 15 MHz. In an embodiment, the receiver 46 bandwidth can vary from 40 kHz to 12 MHz, and the pulse length can vary from 10 ns to 100 us.

On the receive side, the receiver 46 connects to an amplifier 90 which connects to an analog-to-digital (A/D) device 92 that connects to the signal processing block 88. Note, the circuitry 50 includes both digital and analog components. The signal processing block 88 can be all-digital. The amplifier 90 can be integrated with the receiver 46 or in the circuitry 50, and the amplifier 90 is configured to amplify current from the receiver 46 and to provide the amplified current to the A/D device 92 for digitization. The amplifier 90 can include a transimpedance amplifier (TIA). As described above, the receiver 46 can have a bandwidth of between 15-100 MHz (preferably 15 MHz) with a dynamic range of at least 58~73 dB (0 km-30 km with a 10 ns pulse). In an embodiment, the receiver 46 can be an avalanche photodiode (APD) receiver.

In addition to detecting back reflection within about the first 30 km, the OTDR function can be able to determine transmission fiber loss over ~100 km so that loss profiles can be compared to stored or previously obtained values. This can require a different operating mode (different pulse width, repetition rate, etc.) that the mode used to measure and resolve connector back reflections. In this embodiment, the pulse generator 86 and the signal processing block 88 are configurable to adjust the operating mode. The OTDR function can also be available after a fiber cut and repair to repeat the provisioning, test and turn up process. Manual operation can be available during the fiber cut event so that service provider personnel can use the OTDR to locate the fiber cut. Also, as described herein, the OTDR wavelength should be out of the signal band, to permit low loss multiplexing into the transmission fiber.

System Implementation

Figure 5:
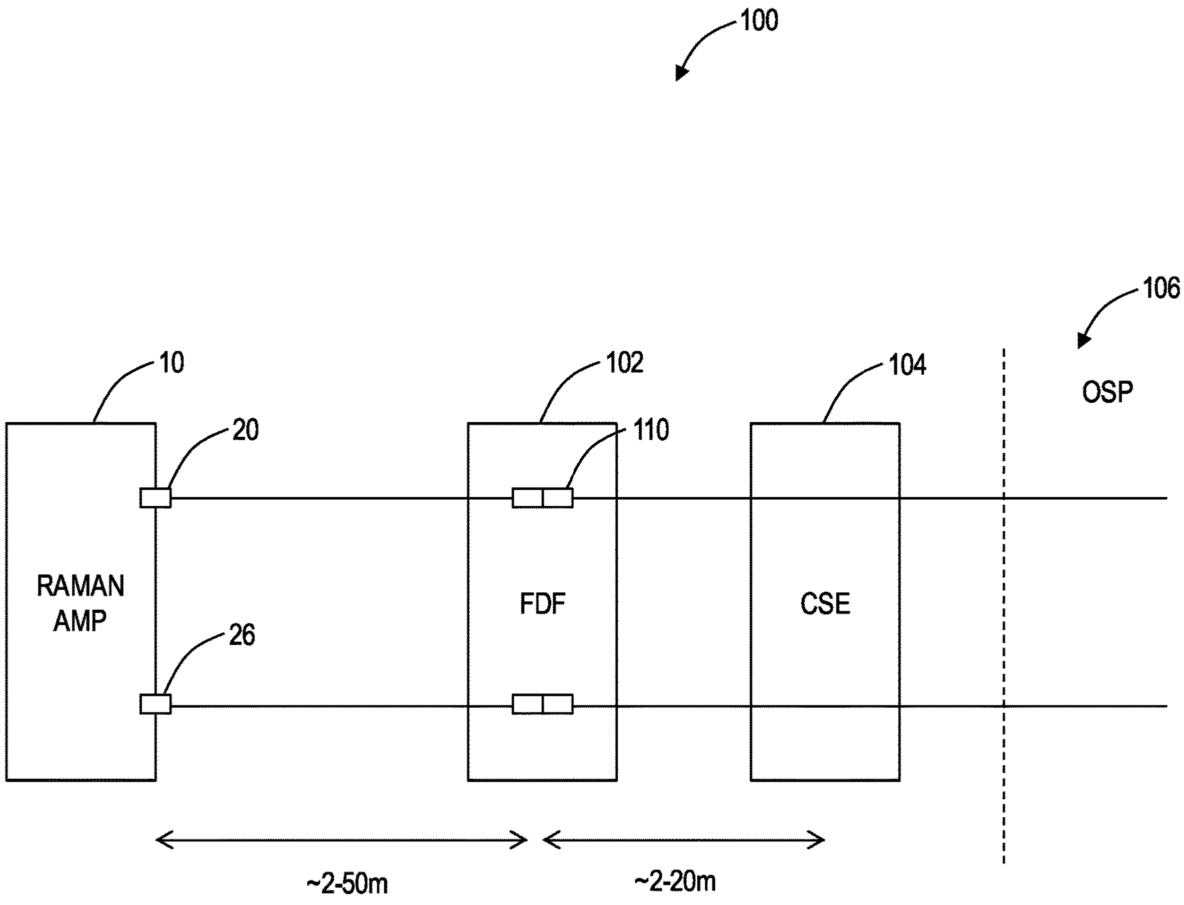
FIG. 5 is a block diagram of an example implementation in a system of the Raman amplifier of FIG. 1.

Referring to FIG. 5, in an embodiment, a block diagram illustrates an example implementation in a system 100 of the Raman amplifier 10. The system 100 can include a point-of-presence (POP) or a line amplifier (LA) site with the Raman amplifier 10 operating in a WDM network element. The POP/LA site can include various fiber-related components such as a fiber distribution frame (FDF) 102 and other equipment such as communication support equipment (CSE) 104. The POP/LA site has fiber that goes out to outside plant (OSP) 106. As those of ordinary skill in the art will recognize, there can be numerous connectors in the POP/LA site that are extremely close to the Raman amplifier 10, and its high-powered Raman pumps 14. For example, the ports 20, 26 can have connectors, and the FDF 102 can have various connectors 110 as well. The connectors can be SC (standard connectors), LC (little connectors), FC (fiber connectors), etc. Importantly, the OTDR function needs to resolve connector problems inside the POP/LA site to ensure good connectors (i.e., less than −45 dB back reflection) in order for the Raman amplifier 10 to turn on. Minimum distances can be as small as 2 m between the Raman amplifier 10 and the FDF 102. This resolution inside the POP/LA site sets the lower bound on the OTDR pulse width and detection requirements, i.e., need to be able to measure pulse height of −45 dB back reflection.

Machine Learning

The approach described herein can include an OTDR that is integrated with an optical line system that can be utilized for ongoing measurements. Advantageously, continuous OTDR measurements can be used to enhance system monitoring to detect issues. As described herein, continuous can be all the time as well as periodically or intermittent. The key is there are OTDR measurements over time. These OTDR measurements over time can provide valuable insights into fiber aging, fiber losses, etc. The OTDR measurements can also be used to detect and localize issues, e.g., fiber splice problems, patch panel losses (PPL), etc.

Of note, OTDR measurements while the optical line system is operational will be affected by Raman amplification. Again, the present disclosure utilizes various machine learning techniques to analyze an OTDR trace with Raman amplification ON to determine the corresponding OTDR trace without Raman amplification. That is, taking an OTDR trace with Raman ON and backing out the OTDR trace when Raman is off. This enables an integrated OTDR to monitor fiber changes over time where the corresponding optical line system utilizes Raman amplification. This can also be used to determine the Raman gain provide over time.

Figure 6A:
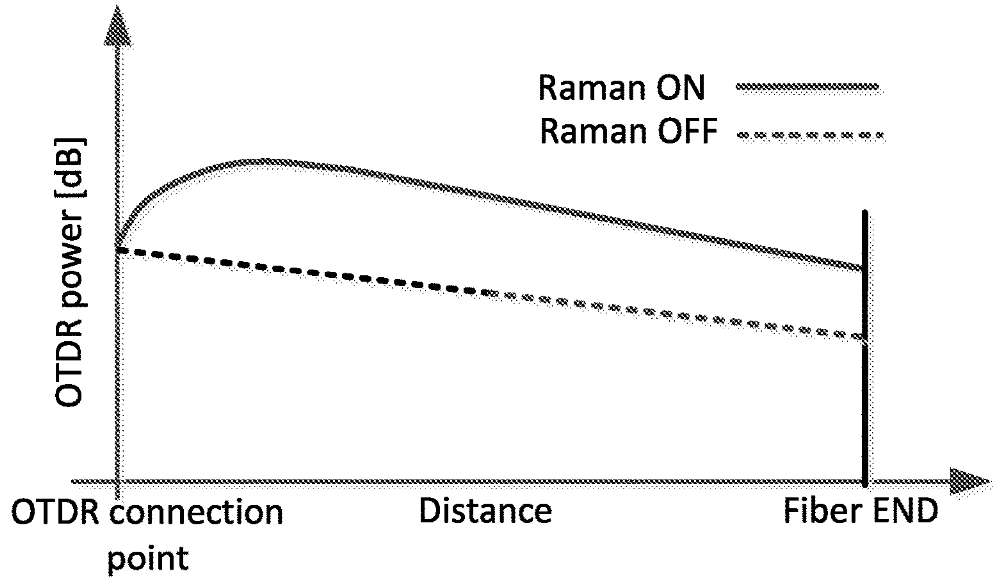
FIG. 6A is a graph of an example OTDR trace with and without Raman amplification.
Figure 6B:
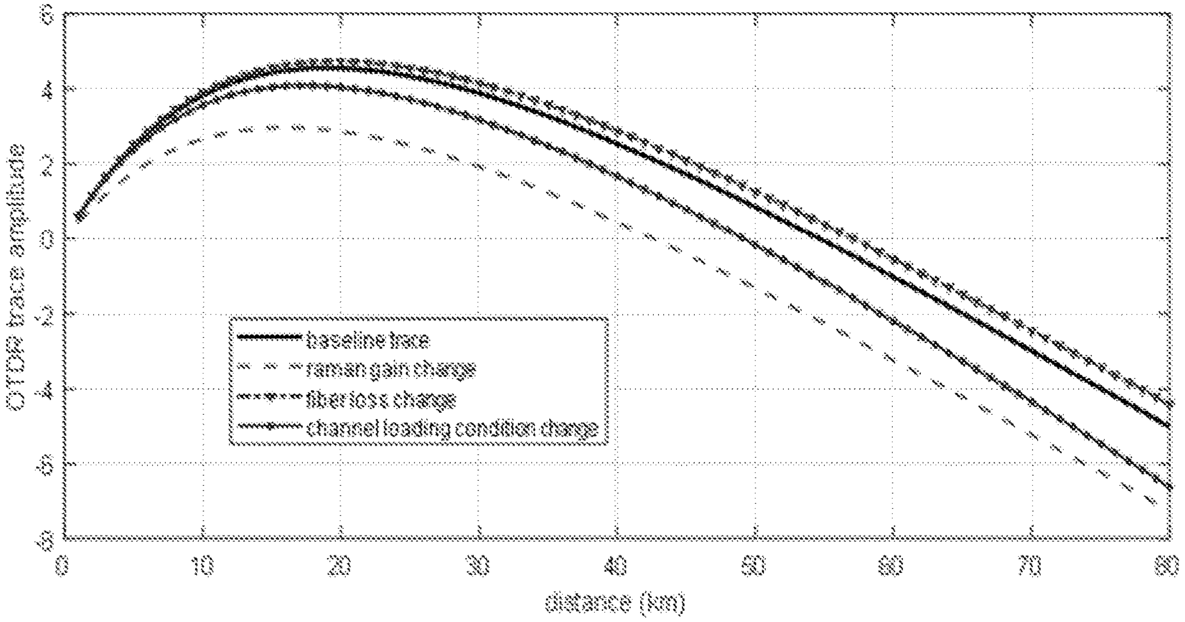
FIG. 6B is a graph of example OTDR traces with different impact factors, e.g., a baseline trace, Raman gain change, fiber loss change, channel loading condition change, etc.

FIGS. 6A and 6B are graphs of an example OTDR trace with and without Raman amplification (FIG. 6A) and of various impact factors (FIG. 6B). Note, there can be an analytical approach where an OTDR trace is taking with Raman amplification OFF (dashed line) and then taken with Raman amplification ON (solid line). The dashed line can be stored and used for future reference to compare with a current OTDR trace with Raman amplification ON. However, this approach is using a static Raman amplification OFF OTDR trace from the beginning and this cannot be used to distinguish or determine Raman gain profile changes and changes in fiber loss over time. Also, there is ongoing uncertainty in terms of patch panel losses (PPL), PPL changes, fiber types, Raman gain coefficient, etc.

Figure 7:
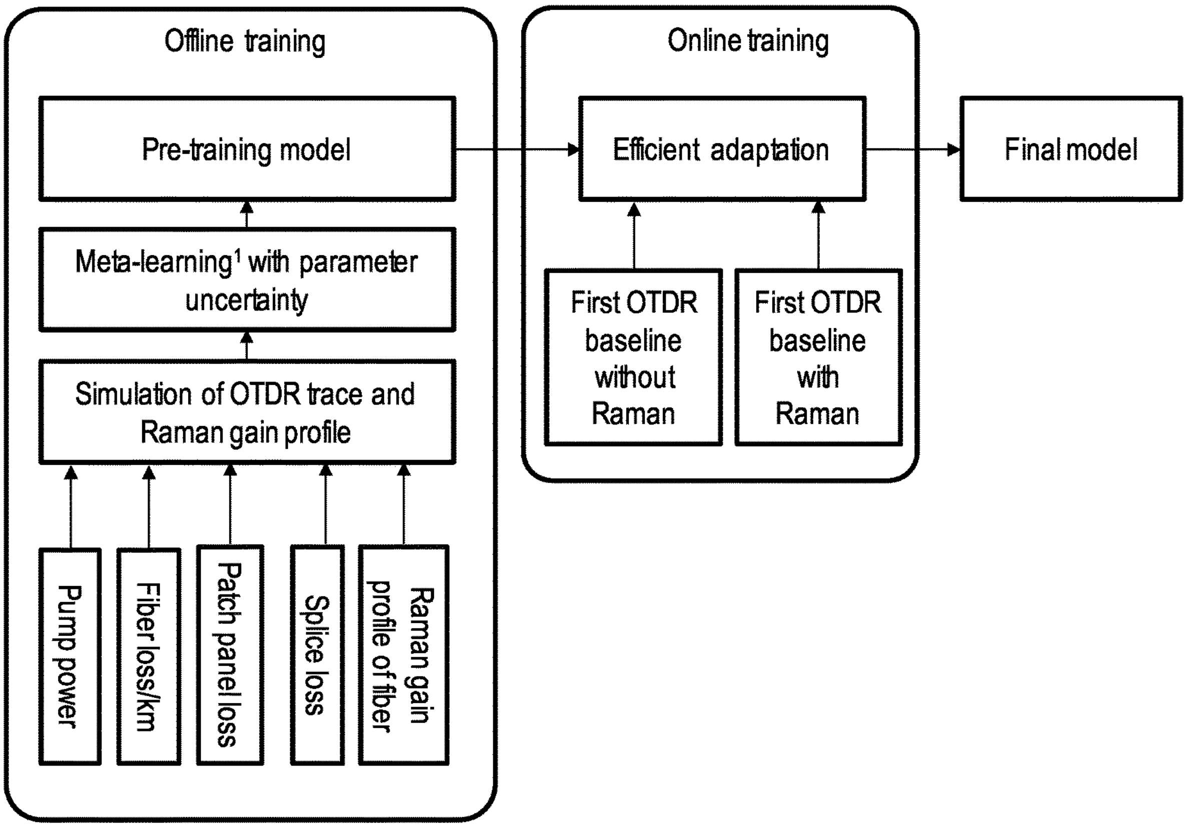
FIG. 7 is a flow diagram of OTDR trace monitoring for change of fiber and Raman gain profile with Raman amplification using Machine Learning.

FIG. 7 is a flow diagram of OTDR trace monitoring for change of fiber and Raman gain profile with Raman amplification using Machine Learning. The OTDR trace monitoring can be implemented as a computer-implemented method, via a controller, via a processing device, via an in-skin (located with) controller in a network element, via a network management system (NMS), and as computer-readable code on a non-transitory computer-readable storage medium.

The present disclosure include machine learning techniques in a trained machine learning model that is used in operation (production) to take an OTDR trace taken with Raman amplification ON to provide a corresponding OTDR trace that is clean and accurate and reflects what the trace should look like with Raman amplification OFF. Accordingly, a current OTDR trace with Raman ON analyzed by the machine learning provides a current OTDR trace with Raman OFF. This can be used to monitor fiber changes over time and to track the Raman gain profile (difference between the OTDR trace with Raman ON and OFF) over time.

Machine learning includes training to develop a model. The OTDR trace monitoring can include offline training+online training to develop the machine learning model.

The offline training uses OTDR traces with different parameters that impact the OTDR trace such as Raman pump power and frequencies, fiber loss/km, PPL, splice losses, Raman gain coefficients, Raman gain profiles of fiber, and the like. The training OTDR traces can be generated by simulation or experiment. The training OTDR traces and related parameters are used for meta-learning with parameter uncertainty. A reference for Meta learning includes Finn, Chelsea, Pieter Abbeel, and Sergey Levine. "Model-agnostic meta-learning for fast adaptation of deep networks." International Conference on Machine Learning. PMLR, 2017. arxiv.org/abs/1703.03400. The output includes a pre-training model.

The online training includes adapting a baseline OTDR trace with Raman and a baseline OTDR trace with Raman on a particular link. This adapting is with the pre-training model to provide the machine learning model. The baseline OTDR traces can be obtained on a particular link at system turn-up.

Impact Factors to OTDR Traces

The following table shows the impact factors to OTDR traces and whether or not they should be alarmed (to note such change):

TABLE 1

| | Impact factors/reasons that OTDR trace changes | Need to be alarmed? |
|---|---|---|
| 1. | Change of lumped loss or reflection events at different locations of fiber | Y |
| 2. | Change of Raman amplification after change of Raman config | N |
| 3. | Change of fiber loss | Y |
| 4. | Unexpected change of Raman amplification | Y |
| 5. | Change of channel loading condition | N |

In the table above, it is seen that among the five impact factors, some of them are normal and should be transparent to the users. Some of them are unexpected and indicating fault. In addition to detecting the fault, it is important to classify the unexpected change to provide guidance on corrective action.

Figure 8A:
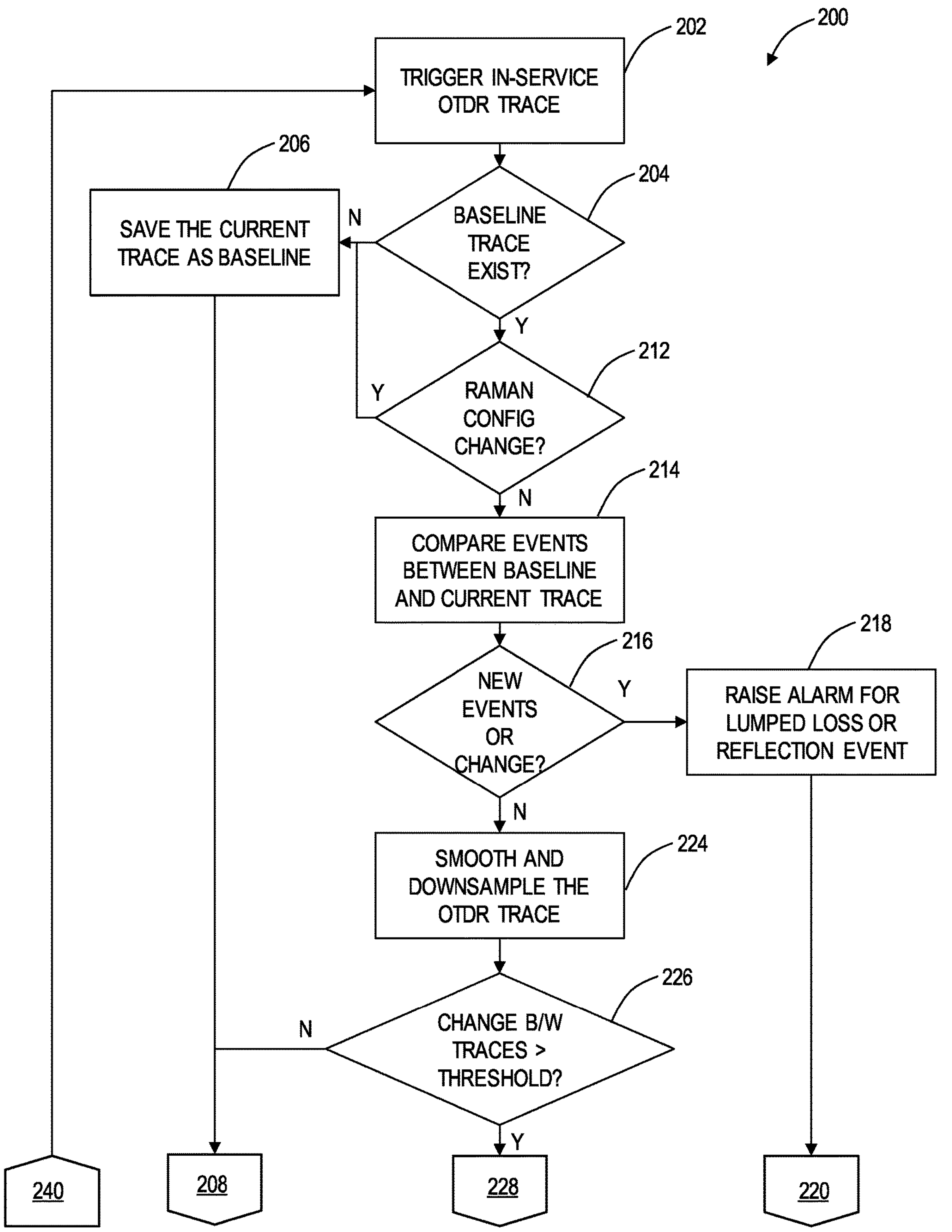
FIGS. 8A and 8B are a flowchart of a process for fault detection and classification of a fiber based on OTDR traces.
Figure 8B:
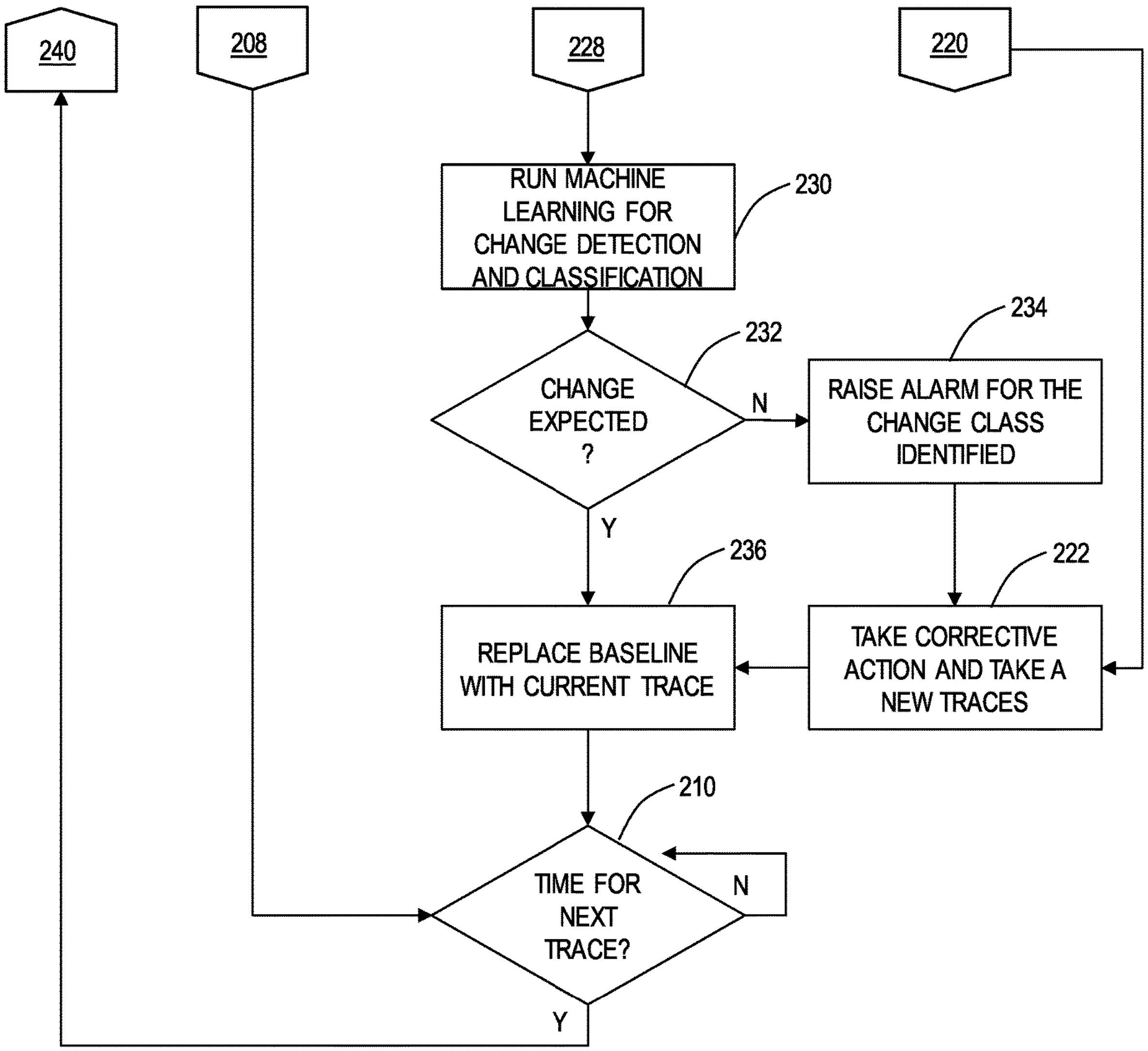

FIGS. 8A and 8B are a flowchart of a process 200 for fault detection and classification of a fiber based on OTDR traces. As described herein, the process 200 can be implemented as a method having steps, via a processing device configured to implement the steps, and as instructions stored in a non-transitory computer-readable medium. The process 200 can be implemented by OTDR data analysis software.

At one or more spans in an optical network, where OTDR equipment is included, such as described herein, a periodical OTDR is triggered (step 202). Once an OTDR trace is taken, an OTDR trace analysis software will check if there is a baseline trace saved (step 204). If not, the current OTDR trace will be saved as baseline (step 206) and the software will directly go to the end of the current iteration (step 208) to wait for the next periodical OTDR trace to be taken (step 210).

Otherwise, the data analysis software will check if the Raman configuration has been changed between the timestamp of the current and baseline trace to cover OTDR change reason #2 in Table 1, i.e., 212 Change of Raman amplification after change of Raman config (step 212). The OTDR data analysis software should be able to get the Raman configuration information easily, because Raman card and OTDR is usually co-located. If the Raman configuration did change (step 212), the current OTDR trace is expected to change from the baseline (step 206). Therefore, current OTDR trace will become the new baseline. After saving new baseline trace, the software will also go to the end of the iteration to wait for the next periodical OTDR trace to be taken (step 210).

Next step is to check change of lumped loss or reflection events to cover change reason #1, i.e., Change of lumped loss or reflection events at different locations of fiber. While Change of lumped loss and reflection events can be detected by Machine learning model with its powerful pattern recognition ability, in this disclosure, we propose to take advantage of the existing OTDR event detection, because it is a technique that has been proved to be accurate and reliable for quantifying discontinuities (i.e., lumped loss event, reflection event) over OTDR traces (step 214). Therefore, the software will simply check if there are new event occurs or if the amplitude of the loss or reflection of any existing events is changed for more than a threshold (step 216). If yes, an alarm will be raised for lumped loss or reflection change (step 218, 220). The software can suggest corrective action to take and then proceed to take new traces (step 222).

Then, the software will check if there is gradual distributed change between the baseline and current OTDR traces. Smoothing and down sampling will be applied first to remove noise and reduce the number of data points (step 224). If there are not changes between the traces greater than a threshold (step 226), the process 200 can go to step 208. Otherwise, as seen in FIG. 6A, the shape of the traces changed differently due to different impact factors. Distinguishing between the different shapes is a job that ML based pattern recognition is good at. Therefore, we trained a machine learning model to classify the change of the OTDR traces (steps 228, 230). The details of the model will be described in the next section.

The output of the Machine Learning model classifies the change of OTDR into 3 groups to cover change reason #3.~5. in Table 1 (steps 232, 234, 236). Change reason #3 and 4 are unexpected changes, therefore alarms will be raised. Change reason #5 is expected, and the current OTDR trace will become the new baseline. If there is an alarm raised by the data analysis software (step 234), corrective action will be required (step 222). After the issue is fixed, a new baseline trace will be taken (step 236). Then, the software will stay idle until it is time for the next iteration (steps 210, 240).

Machine Learning Model for Classification of Change of In-Service OTDR Traces

The conventional OTDR analysis is only focused on event detection. Event detection is good for detecting and quantifying discontinuity over OTDR trace due to lumped loss and reflection events. However, the effect of Raman amplification, fiber loss or signal loading condition is gradually distributed over the entire OTDR trace. As shown in FIG. 6A, the OTDR trace will show different shapes with different impact factors. Machine learning is known to be good at pattern recognition, therefore we trained a machine learning mode to classify the gradual changes of in-service OTDR traces.

Figure 9:
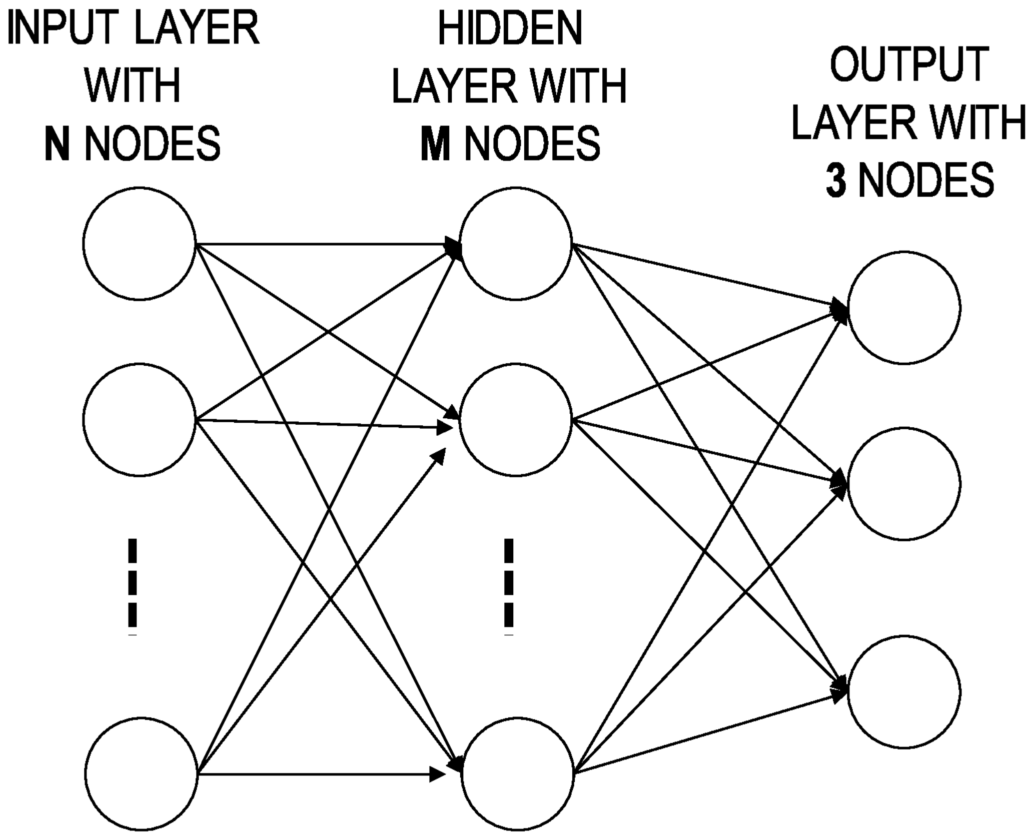
FIG. 9 is a diagram of the structure of the machine learning model where there the Input is the delta between the current OTDR trace and the baseline OTDR trace.

FIG. 9 is a diagram of the structure of the machine learning model where there the Input is the delta between the current OTDR trace and the baseline OTDR trace. The number of samples per trace at the input, N, is down sampled from the original OTDR trace which is usually more than 10 k points per trace. This ML model is to classify gradual change over the OTDR trace, so much fewer points per trace is needed—N can be set to a value less than 100 but still persevering the shape of the change. For hidden layer, number of hidden layers and number of neurons per layer could be optimized for best performance. In a proof-of-concept model, we found 1 hidden layer with M=100 neurons gives us good enough performance within acceptable training time. The output layer has 3 nodes, to identify the change due to reason #3, #4, #5 in Table 1. Therefore, the possible outputs of this model are [1,0,0] representing reason #3, [0,1,0] representing reason #4, [0,0,1] representing reason #5.

For generating training data, a 2-step process can be implemented, namely (1) generation of a pool of in-service OTDR traces and (2) generation of delta between in-service OTDR traces due to change in each class.

Figure 10:
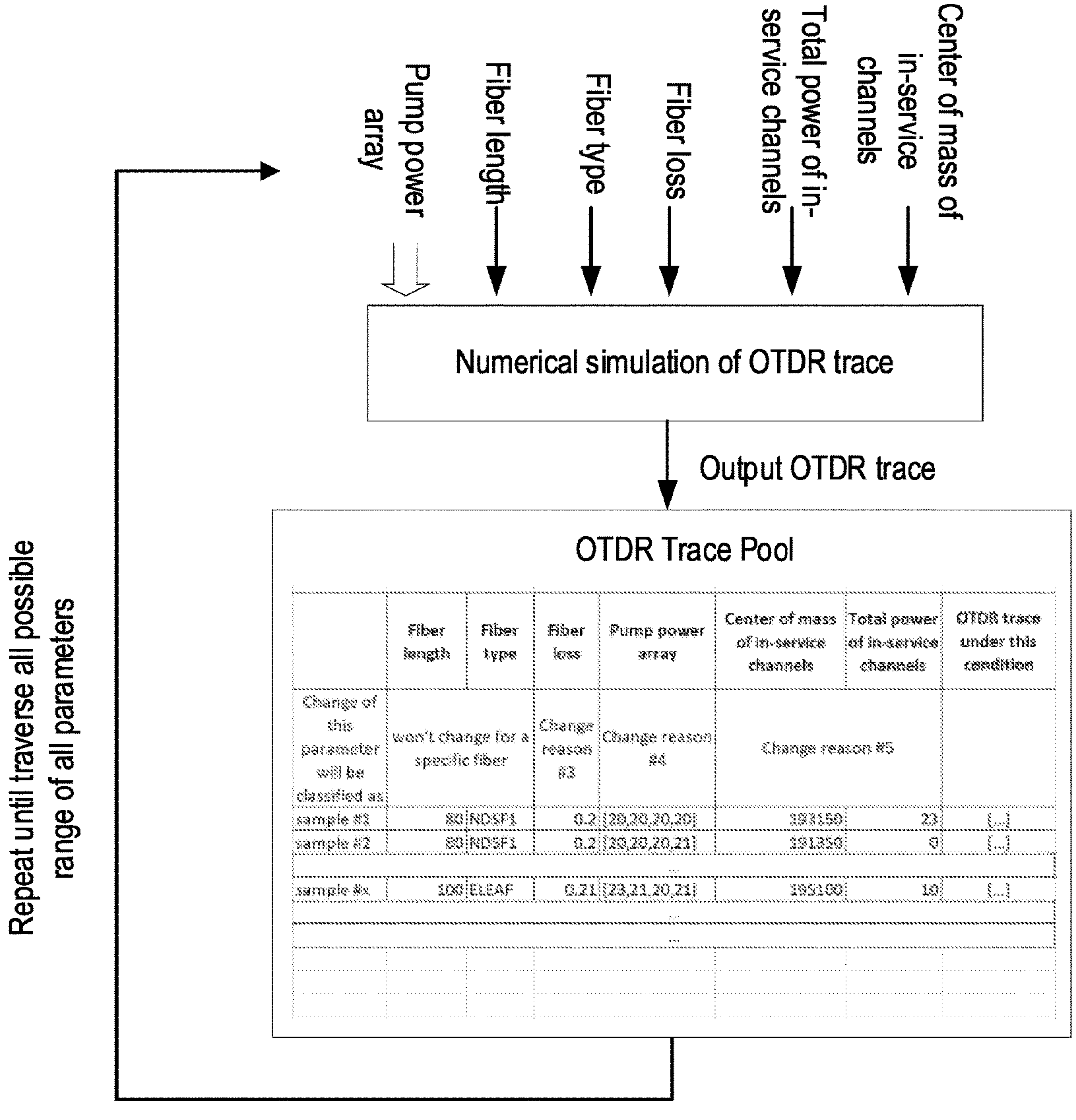
FIG. 10 is a diagram describes the generation of a pool of in-service OTDR traces, for machine learning model training.

FIG. 10 is a diagram describes the $1^{st}$ step, namely generation of a pool of in-service OTDR traces. In-service OTDR traces are generated by simulation including effects from fiber loss, Raman amplification and Stimulated Raman scattering (SRS) from in-service channels. Different fiber loss is represented by different loss per kilometer of the fiber. Different Raman amplification condition is simulated by traversing the possible range of all Raman pumps and different fiber types with different Raman gain coefficients. SRS effect is also a function of fiber a type as well as the center of mass and total power of the in-service channels. The OTDR traces along with the input parameters are saved in the OTDR trace pool.

The propose of the ML model is for classifying the change between two OTDR traces at different times, therefore the training data should be the delta between two OTDR traces. Since it is impossible to traverse all traces in the OTDR trace pool and all possible changes to each trace, a random selection process is implemented, which is shown in FIG. 11 which is a flowchart of a random selection process 300 for determining machine learning training data.

In the process 300, delta traces are generated for the change reason #i. i=3~5, respectively, starting with #3 (step 302). Two traces are to be selected from the OTDR trace pool (step 304, 306). The first trace is selected completely randomly as baseline trace. The second trace is randomly selected as current trace from a subset of the trace pool, which only has changes in the parameters under change reason #i (step 306). The change between the two traces must be detectable therefore the max delta (step 308) between the two traces must be more than a threshold for the delta trace to be used in the training data pool (step 310). The random selection process will be iterated until there are enough samples of the all three classes (steps 312-320).

Note, this example is only to detect the impact factors #3-#5 with the machine learning model, namely change in fiber loss, unexpected change of Raman amplification, and change of channel loading condition. The impact factor #1 is detectable based on a comparison between two traces, i.e., change of lumped loss or reflection events at different locations of fiber. The impact factor #1 does not require machine learning for detection. Also, the impact factor #2 is detectable based on reading configuration, i.e., change of Raman amplification after change of Raman config.

Those skilled in the art will recognize that these five impact factors #1-#5 are merely exemplary factors and a practical implementation can include less or more impact factors. The key here is the ability to detect what is impacting OTDR traces.

FIG. 12 are example confusion matrices illustrating the machine learning model can correctly classify OTDR changes greater than 99% of the time. In a proof of concept, we generated 150,000 delta OTDR traces for the 3 classes for model training. The data is divided by 70%/15%/15% for training, testing and validation. We used a neural network with 100 nodes in input layer (i.e., the trace is down sampled to 100 points) and 1 hidden layer with 100 nodes. FIG. 12 shows the confusion matrix after the model trained—the model can correctly classify the OTDR change >99% of time.

We used 0.5 as threshold in the proof of concept. This threshold was set based on experience with the noise of the OTDR trace. If the delta between the 2 traces is less than 0.5, it could be due to noise. I did play with the threshold value when I test the proof-of-concept model. A threshold=0.25 also gives pretty good results.

OTDR Trace Monitoring Process

FIG. 13 is a flowchart of an OTDR trace monitoring process 400. The OTDR trace monitoring process 400 can be implemented as a method having steps, via a processing device configured to implement the steps, and as instructions stored in a non-transitory computer-readable medium.

The OTDR trace monitoring process 400 includes obtaining data associated with a plurality of Optical Time Domain Reflectometer (OTDR) traces each performed at a different time (step 402); responsive to changes between the plurality of OTDR traces being above a threshold, analyzing the changes between the plurality of OTDR traces with a trained machine learning model (step 404); and determining an impact factor based on the machine learning model, wherein the impact factor is a classification of the changes between the plurality of OTDR traces (step 406).

The OTDR trace monitoring process 400 can further include, prior to the analyzing, comparing the between the plurality of OTDR traces to one another; detecting one of a lumped loss or reflection event based on the comparing; and raising an alarm based thereon. The OTDR trace monitoring process 400 can further include subsequent to the determining, raising an alarm based thereon with the classification and with suggested corrective actions. The OTDR trace monitoring process 400 can further include storing a specific OTDR trace of the plurality of OTDR traces as a baseline; and performing the analyzing based on a current OTDR trace of the plurality of OTDR traces and the baseline. The OTDR trace monitoring process 400 can further include prior to the analyzing and the determining, one or more of smoothing and down sampling one of the plurality of OTDR traces.

The impact factors can include a plurality of change of lumped loss or reflection events at different locations of fiber, change of Raman amplification after change of Raman configuration, change of fiber loss, unexpected change of Raman amplification, and change of channel loading condition. The plurality of OTDR traces can be performed in-service. The OTDR trace monitoring process 400 can further include training the machine learning model prior to the analyzing. The training can utilize randomly selected sample that exhibit a given impact factor.

In another embodiment, a network element in an optical network includes an Optical Time Domain Reflectometer (OTDR) and circuitry connected thereto, wherein the circuitry is configured to implement the process 400.

CONCLUSION

The motivation of this work is that we got asked by operators "If our fibers are aging"? Unfortunately, we do not have the answer to this now since we do not have a method to isolate the fiber aging effect (mainly reflected by fiber loss/km change) from other effects with any measurements related to fiber loss in our system. We can measure total fiber loss based on total Tx and Rx power at the two ends of the fiber, but this total fiber loss includes fiber loss itself, patch panel loss as well as Raman gain and channel loading impact. There is no way to distinguish these effects with the total power measurement data. Therefore, OTDR is the best way (probably the only way) to find the answer. The challenge with OTDR trace is that if we run in-service OTDR trace, the trace will be impacted by Raman gain from Raman amplification and SRS effects from the service channels. There is a requirement to isolate the fiber loss change. Or even better, we can classify the change due to these impacting factors. For example, if the loss between the Raman pumps and the faceplate inside the Raman card is degrading or if the Patch panel loss between the Raman card and the fiber has changed, Raman gain will change, but it will not be identified by any measurements in the system.

It will be appreciated that some embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A non-transitory computer-readable medium comprising instructions that, when executed, cause one or more processors to perform steps of:

obtaining a machine learning model trained on Optical Time Domain Reflectometer (OTDR) traces exhibiting variations in Raman amplification performance, variations in fiber loss, and variations in channel loading condition, to classify a gradual distributed change between OTDR traces as one of (i) a change of fiber loss, (ii) an unexpected change of Raman amplification, or (iii) a change of channel loading condition;

obtaining data associated with a plurality of OTDR traces taken in-service with Raman amplification ON in an optical fiber system each performed at a different time;

responsive to changes between the plurality of OTDR traces being above a threshold, analyzing the changes between the plurality of OTDR traces with a trained machine learning model;

determining an impact factor based on the machine learning model, wherein the impact factor is a classification of the changes between the plurality of OTDR traces; and performing an automated response based on the impact factor, wherein the automated response comprises (i) raising an alarm identifying the change of fiber loss with a suggested corrective action comprising a fiber inspection at a location along an optical fiber of the optical fiber system derived from a current OTDR trace of the plurality of OTDR traces responsive to the impact factor being the change of fiber loss, (ii) raising an alarm identifying the unexpected change of Raman amplification with a suggested corrective action comprising a Raman pump inspection responsive to the impact factor being the unexpected change of Raman amplification, and (iii) replacing a baseline OTDR trace with the current OTDR trace of the plurality of OTDR traces as an updated baseline OTDR trace for analyzing a subsequent OTDR trace responsive to the impact factor being the change of channel loading condition.

2. The non-transitory computer-readable medium of claim 1, wherein the impact factors include a plurality of change of lumped loss or reflection events at different locations of fiber, change of Raman amplification after change of Raman configuration, change of fiber loss, unexpected change of Raman amplification, and change of channel loading condition.

3. The non-transitory computer-readable medium of claim 2, wherein change of lumped loss or reflection events are detected based on comparing OTDR reported events between current OTDR trace of the plurality of OTDR traces and the baseline.

4. The non-transitory computer-readable medium of claim 1, wherein the steps further include storing a specific OTDR trace of the plurality of OTDR traces as a baseline; and performing the analyzing based on a current OTDR trace of the plurality of OTDR traces and the baseline.

5. The non-transitory computer-readable medium of claim 1, wherein the steps further include prior to the analyzing and the determining, one or more of smoothing and down sampling one of the plurality of OTDR traces.

6. The non-transitory computer-readable medium of claim 1, wherein the steps further include subsequent to the determining, raising an alarm based thereon with the classification and with suggested corrective actions.

7. The non-transitory computer-readable medium of claim 1, wherein the plurality of OTDR traces are performed in-service.

8. The non-transitory computer-readable medium of claim 1, wherein the steps further include training the machine learning model prior to the analyzing.

9. The non-transitory computer-readable medium of claim 8, wherein the training utilizes randomly selected sample that exhibit a given impact factor.

10. A method comprising steps of:

obtaining a machine learning model trained on Optical Time Domain Reflectometer (OTDR) traces exhibiting variations in Raman amplification performance, variations in fiber loss, and variations in channel loading condition, to classify a gradual distributed change between OTDR traces as one of (i) a change of fiber loss, (ii) an unexpected change of Raman amplification, or (iii) a change of channel loading condition;

obtaining data associated with a plurality of OTDR traces taken in-service with Raman amplification ON in an optical fiber system each performed at a different time;

responsive to changes between the plurality of OTDR traces being above a threshold, analyzing the changes between the plurality of OTDR traces with a trained machine learning model;

determining an impact factor based on the machine learning model, wherein the impact factor is a classification of the changes between the plurality of OTDR traces; and performing an automated response based on the impact factor, wherein the automated response comprises (i) raising an alarm identifying the change of fiber loss with a suggested corrective action comprising a fiber inspection at a location along an optical fiber of the optical fiber system derived from a current OTDR trace of the plurality of OTDR traces responsive to the impact factor being the change of fiber loss, (ii) raising an alarm identifying the unexpected change of Raman amplification with a suggested corrective action comprising a Raman pump inspection responsive to the impact factor being the unexpected change of Raman amplification, and (iii) replacing a baseline OTDR trace with the current OTDR trace of the plurality of OTDR traces as an updated baseline OTDR trace for analyzing a subsequent OTDR trace responsive to the impact factor being the change of channel loading condition.

11. The method of claim 10, wherein the impact factors include a plurality of change of lumped loss or reflection events at different locations of fiber, change of Raman amplification after change of Raman configuration, change of fiber loss, unexpected change of Raman amplification, and change of channel loading condition.

12. The method of claim 10, wherein the steps further include storing a specific OTDR trace of the plurality of OTDR traces as a baseline; and performing the analyzing based on a current OTDR trace of the plurality of OTDR traces and the baseline.

13. The method of claim 10, wherein the steps further include prior to the analyzing and the determining, one or more of smoothing and down sampling one of the plurality of OTDR traces.

14. The method of claim 10, wherein the steps further include subsequent to the determining, raising an alarm based thereon with the classification and with suggested corrective actions.

15. The method of claim 10, wherein change of lumped loss or reflection events are detected based on comparing OTDR reported events between current OTDR trace of the plurality of OTDR traces and the baseline.

16. The method of claim 10, wherein the plurality of OTDR traces are performed in-service.

17. The method of claim 10, wherein the steps further include training the machine learning model prior to the analyzing.

18. The method of claim 17, wherein the training utilizes randomly selected sample that exhibit a given impact factor.

19. A network element in an optical network comprising an Optical Time Domain Reflectometer (OTDR) and circuitry connected thereto, wherein the circuitry is configured to:

obtain a machine learning model trained on OTDR traces exhibiting variations in Raman amplification performance, variations in fiber loss, and variations in channel loading condition, to classify a gradual distributed change between OTDR traces as one of (i) a change of fiber loss, (ii) an unexpected change of Raman amplification, or (iii) a change of channel loading condition;

obtain data associated with a plurality of OTDR traces taken in-service with Raman amplification ON in an optical fiber system each performed at a different time, responsive to changes between the plurality of OTDR traces being above a threshold, analyze the changes between the plurality of OTDR traces with a trained machine learning model, determine an impact factor based on the machine learning model, wherein the impact factor is a classification of the changes between the plurality of OTDR traces, and performing an automated response based on the impact factor, wherein the automated response comprises (i) raising an alarm identifying the change of fiber loss with a suggested corrective action comprising a fiber inspection at a location along an optical fiber of the optical fiber system derived from a current OTDR trace of the plurality of OTDR traces responsive to the impact factor being the change of fiber loss, (ii) raising an alarm identifying the unexpected change of Raman amplification with a suggested corrective action comprising a Raman pump inspection responsive to the impact factor being the unexpected change of Raman amplification, and (iii) replacing a baseline OTDR trace with the current OTDR trace of the plurality of OTDR traces as an updated baseline OTDR trace for analyzing a subsequent OTDR trace responsive to the impact factor being the change of channel loading condition.

20. The network element of claim 19, wherein the circuitry is further configured to subsequent to a determination of the impact factor, raising an alarm based thereon with the classification and with suggested corrective actions.

* * * * *